United States Patent
Olsson et al.

(10) Patent No.: US 12,276,241 B2
(45) Date of Patent: Apr. 15, 2025

(54) METHOD FOR NON-INTRUSIVE RESPONSE TIME EVALUATION OF A COMPONENT, UNIT OR SYSTEM OF A VEHICLE

(71) Applicant: Volvo Truck Corporation, Gothenburg (SE)

(72) Inventors: Håkan Olsson, Nödinge (SE); Amanda Larsson, Borås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 214 days.

(21) Appl. No.: 18/012,305

(22) PCT Filed: Jun. 1, 2021

(86) PCT No.: PCT/EP2021/064692
§ 371 (c)(1),
(2) Date: Dec. 22, 2022

(87) PCT Pub. No.: WO2021/259602
PCT Pub. Date: Dec. 30, 2021

(65) Prior Publication Data
US 2023/0313765 A1     Oct. 5, 2023

(30) Foreign Application Priority Data
Jun. 23, 2020  (EP) ..................... 20181722

(51) Int. Cl.
*F02M 26/49*     (2016.01)
*F02M 26/48*     (2016.01)
(52) U.S. Cl.
CPC ............ *F02M 26/49* (2016.02); *F02M 26/48* (2016.02)
(58) Field of Classification Search
CPC .... F02M 26/49; F02M 26/48; G05B 23/0235; G07C 5/0808
See application file for complete search history.

(56) References Cited

U.S. PATENT DOCUMENTS

2002/0129799 A1*  9/2002  Wang ..................... F02M 26/49
                                                              73/114.76
2012/0167665 A1*  7/2012  Garimella .......... G05B 23/0221
                                                                73/23.31

OTHER PUBLICATIONS

International Search Report and Written Opinion of the International Searching Authority, PCT/EP2021/064692, mailed Aug. 5, 2021, 14 pages.
Extended European Search Report dated Nov. 20, 2020, for European Patent Application No. 20181722.8, 9 pages.

* cited by examiner

*Primary Examiner* — Xiao En Mo
(74) *Attorney, Agent, or Firm* — Sage Patent Group

(57) ABSTRACT

A method including:
  repeatedly obtaining information in a control unit regarding a set operation value and an actual operation value of a component, unit, or system;
  repeatedly evaluating a difference between a set operation value and the actual operation value;
  if a difference exceeds a predefined minimum difference, measuring a response time from when the minimum difference was exceeded until a predefined change of the actual value is achieved, and/or measuring a change of the actual value during a predefined response time, remaining active if the set operation value is continuously exceeds the actual value; and
  if the response time is longer than the predefined response time and/or if the change of the actual value has not achieved the predefined change, generating a fault signal.

21 Claims, 4 Drawing Sheets METHOD FOR NON-INTRUSIVE RESPONSE TIME EVALUATION OF A COMPONENT, UNIT OR SYSTEM OF A VEHICLE

CROSS REFERENCE TO RELATED APPLICATIONS

This application is a 35 U.S.C. § 371 national stage application of PCT International Application No. PCT/EP2021/064692 filed on Jun. 1, 2021, which in turn claims foreign priority to European Patent Application No. 20181722.8, filed on Jun. 23, 2020, the disclosures and content of which are incorporated by reference herein in their entirety.

TECHNICAL FIELD

The invention relates to a method for non-intrusive response time evaluation of a component, unit or system of a vehicle. The present invention further relates to a control unit, a vehicle, a computer readable medium and a computer program.

The invention can be applied in heavy-duty vehicles, such as trucks, buses and construction equipment. Although the invention will be described with respect to a truck, the invention is not restricted to this particular vehicle, but may also be used in other vehicles such as buses, construction equipment vehicles, including wheel loaders and excavators, and passenger cars etc.

BACKGROUND

For some components, units and systems of vehicles it may be important to monitor their response times in order to verify whether they are functioning properly or not. In fact, too slow response may negatively affect vehicle performance, such as driving performance and environmental impact.

It is known to perform response time evaluation both intrusively and non-intrusively, where the latter means that the information required for performing the response time evaluation is obtained during operation of the component, unit or system without interfering with the operation of the component, unit or system. In other words, non-intrusive response time evaluation may be regarded as passive monitoring, without affecting the normal operation of the component, unit or system. On the contrary, intrusive response time evaluation means that the normal operation of the component, unit or system has to be interfered in order to conduct the evaluation.

For some vehicle components, there are, or will be, legal requirements on several markets to detect slow response beyond specifications. For example, EGR (Exhaust Gas Recirculation) valve is such a component where there are legal requirements for trucks to detect slow response beyond specifications, such as in the EU, USA and China.

In addition, in for example the US, there are requirements to promote the use of non-intrusive monitors, making it more difficult to get approval for intrusive monitors unless there is significant proof that such strategies don't have a negative effect on emissions.

In view of the above, there is a strive to develop improved non-intrusive response time evaluation methods for vehicles.

SUMMARY

An object of the invention is to provide an improved method for non-intrusive response time evaluation of a component, unit or system of a vehicle, or at least to provide a suitable alternative. Another object of the invention is to provide an improved control unit, vehicle, computer readable medium and/or computer program in which the improved non-intrusive response time evaluation method is used and/or implemented.

According to a first aspect of the invention, the object is achieved by a method according to claim 1. According to a second aspect of the invention, the object is achieved by a control unit according to claim 17. According to a third aspect of the invention, the object is achieved by a vehicle according to claim 18. According to a fourth aspect of the invention, the object is achieved by a computer readable medium according to claim 21. According to a fifth aspect of the invention, the object is achieved by a computer program according to claim 22.

According to the first aspect of the invention, the object is achieved by a method for non-intrusive response time evaluation of a component, unit or system of a vehicle comprising at least one control unit and at least one sensor for measuring an actual operation value of the component, unit, or system, the method comprising:

- repeatedly obtaining information in the control unit regarding a set operation value and an actual operation value of the component, unit, or system;
- repeatedly evaluating if a difference between the set operation value and the actual operation value is exceeding a predefined minimum difference;
- if the difference is exceeding the predefined minimum difference, measuring a response time from a time when the predefined minimum difference was exceeded until a time when a predefined change of the actual value is achieved and/or measuring a change of the actual value during a predefined response time, wherein the measuring of the response time and/or change only remains active if the set operation value is continuously greater than the actual value at positive measurement or continuously smaller than the actual value at negative measurement; and
- if the measured response time is longer than the predefined response time and/or if the change of the actual value has not achieved the predefined change during the predefined response time, generating a fault signal indicative of a fault of the component, unit or system.

Preferably, the response time evaluation method is performed in real time during operation of the component, unit or system. Still further, the response time evaluation method is preferably performed continuously in real time while the component, unit or system is in operation. However, according to another embodiment, some steps of the method may be performed after the component, unit or system has been in operation, such as any one of the steps following the information obtaining step as mentioned in the above. Such steps may be performed on-board the vehicle and/or off-board the vehicle, such as in an external computer server, cloud-based server or the like.

The present invention relates to monitoring of the function of a component, unit or system. The component, unit or system is adapted to be controlled by continuously or intermittently receiving set operation values from e.g. a control unit, wherein an actual operation value thereof is controlled with respect to the set operation value. In other words, the actual operation value is controlled to reach the set operation value. Purely by way of example, the component, unit or system may be controlled by use of a P (Proportional), PI (Proportional Integral) or PID (Proportional Integral Derivative) controller as known in the prior art, or by any other suitable control logic. The control may be performed in a control loop employing feedback.

By the provision of the method as disclosed herein, improved non-intrusive response time evaluation of a component, unit or system of a vehicle is achieved. More particularly, it has been realized that by the present invention, unwanted impact of a set operation value control strategy can be reduced or even eliminated. In fact, in order to properly judge if a component, unit or system has a too slow response, the evaluation should not be performed based on information from when e.g. a control strategy with slow set operation value changes is currently used. Thereby, by measuring response time and/or change when the predefined minimum difference is exceeded, it can be assured that the response time and/or change measurement corresponds to a situation when not a too slow changing control strategy is used. In addition, by measuring from the time when the difference was exceeded until the time when the predefined change of the actual value is achieved and/or by measuring the change of the actual value during the predefined response time, it can further be assured that the measurement is not relating to other control strategies involving slow change of the actual value. For example, the change of the actual value may by the control strategy be slowed down when the actual value is approaching the set operation value, or vice versa. Accordingly, by remaining the measuring of the response time and/or change active if the set operation value is continuously greater than the actual value at positive measurement or continuously smaller than the actual value at negative measurement; the measurement will more accurately correspond to the situation when the component, unit or system is not affected by any control strategy which deliberately slows down the change of the actual value. As such, an improved non-intrusive response time evaluation method is provided. Accordingly, the measuring of the response time and/or change is cancelled if the set operation value at any time during the measurement is smaller than the actual value at positive measurement or larger than the actual value at negative measurement.

Positive measurement is herein defined as a situation when the actual operation value is increasing with respect to a reference, such as zero, to reach the set operation value. Accordingly, negative measurement is defined as a situation when the actual value is decreasing with respect to a reference to reach the set operation value.

Optionally, the measuring of the response time and/or change may only remain active if the set operation value is continuously outside of an end point range value with respect to an actual operation value at the time when the predefined minimum difference was exceeded, wherein the end point range value and the actual operation value at the time when the predefined minimum difference was exceeded define end points for a range which corresponds to the predefined minimum difference. Still optionally, the predefined change of the actual value may be smaller than the predefined minimum difference. Accordingly, the measuring of the response time and/or change is cancelled if/when the set operation value is within the range defined by the end points. Thereby, the response time evaluation can be further improved. In fact, if the set operation value during the response time measurement is changed so that it is within the range defined by the end points, it may slow down the change of the actual value. As a consequence, this may lead to that the response time is not reflecting the possible response time of the component, unit or system during normal operation. As such, it has been realized that the response time evaluation can be further improved by allowing the measuring of the response time to only remain active if the set operation value is continuously outside the end point range value, and by cancelling the measuring of the response time if/when the set operation value is within the range defined by the end points. In addition, by using a predefined change of the actual value which is smaller than the predefined minimum difference, the measurement may more accurately correspond to the situation when the component, unit or system is not affected by any control strategy which deliberately slows down the change of the actual value.

Optionally, the measuring of the response time and/or change may only remain active if the set operation value is continuously above a value defined by the actual value together with a positive predefined threshold value at positive measurement, and/or continuously below a value defined by the actual value together with a negative predefined threshold value at negative measurement. Accordingly, the measuring of the response time and/or change is cancelled if/when the set operation value falls below a value defined by the actual value together with the positive threshold value at positive measurement and if/when the set operation value is above a value defined by the actual value together with a negative predefined threshold value at negative measurement. Thereby, the measurement may more accurately correspond to the situation when the component, unit or system is not affected by any control strategy which deliberately slows down the change of the actual value.

Optionally, the method may further comprise: if the difference is not exceeding the predefined minimum difference, waiting with measuring the response time and/or measuring the change of the actual value until the predefined minimum difference is exceeded.

Optionally, the method may further comprise obtaining operation mode information indicative of different operation modes of the component unit or system, wherein the method further comprises that the measuring of the response time and/or measuring of the change of the actual value is carried out if the difference is exceeding the predefined minimum difference while also the operation mode information indicates that the component, unit or system is currently operating in a specific operation mode which is regarded as suitable for response time measurement. For example, the operation mode information may relate to a control strategy for the component, unit or system, where in some operation modes the control may be slower, not reflecting the actual capacity of the component, unit or system. Therefore, the response time evaluation can be further improved by also making use of such operation mode information, thereby making it possible to avoid response time evaluation when unsuitable operation modes are used.

Optionally, the component, unit or system may be operable within an operation range defined by a minimum operation value and a maximum operation value, and the method may further comprise that the measuring of the response time and/or measuring of the change of the actual value is carried out if the difference is exceeding the predefined minimum difference while also the actual operation value is outside of a predefined limit value associated with any one of the minimum and maximum operation values. Thereby, the method can be further improved in that the response time and/or change measurement may more accurately reflect the actual capacity of the component, unit or system. In fact, it has been realized that some control strategies may slow down the change of the actual value when the actual value is closer to the minimum and maximum operation values.

Optionally, the method may further comprise: if the measured response time is equal to or shorter than the predefined response time and/or if the measured change of the actual value is equal to or exceeding the predefined change, generating a no-fault signal indicative of a no-fault of the component, unit or system.

Optionally, the generated fault signal indicative of a fault of the component, unit or system may be used for generating a warning signal to e.g. a user of the vehicle. Additionally, or alternatively, the generated fault signal may optionally be stored and used at a later occasion, such as during service of the vehicle. As another non-limiting example, the generated fault signal may be transmitted from the vehicle by wired and/or wireless communication means to e.g. an external computer or the like.

Optionally, the method may further comprise obtaining operation area information indicative of at least two different operation areas of the component, unit or system, wherein a respective predefined minimum difference, a respective predefined change and/or a respective predefined response time is/are associated with each one of the at least two different operation areas, wherein the response time measuring and/or the change measuring is carried out in each one of the at least two different operation areas, and if any one of the measured response times from each respective response time measuring is longer than the respective predefined response time for the respective operation area and/or if any one of the measured changes of the actual value from each respective change measuring has not achieved the respective predefined change for the respective operation area, generating the fault signal indicative of a fault of the component, unit or system. Thereby, further improved response time evaluation of the component, unit or system may be achieved. In fact, it has been further realized that a component, unit or system of a vehicle may function differently in different operation areas. Therefore, by evaluating response times and/or changes, with respect to predefined response times which may differ or be equal, for the respective operation areas, further improved response time evaluation may be achieved. The predefined minimum differences and the predefined changes for each operation area may also differ or be set equal. As such, the method may be tailored for each respective operation area, implying further improved response time evaluation. Still optionally, purely by way of example, the at least two operation areas may be different and not overlap each other, they may at least partly overlap each other and/or at least one of the operation areas may define a sub-range of another one of the at least two operation areas. Thereby the method may be further improved by tailoring the response time evaluation so that it reflects the expected behaviour of the component, unit or system. Still optionally, a size of each operation area is preferably defined by each respective predefined minimum difference.

Still optionally, the method may further comprise obtaining operation direction information indicative of two different operation directions of the component, unit or system, wherein a respective predefined minimum difference, a respective predefined change and/or a respective predefined response time is/are associated with each one of the two different operation directions, wherein the response time measuring and/or the change measuring is carried out in each one of the two different operation directions, and if any one of the measured response times from each respective response time measuring is longer than the respective predefined response time for the respective operation direction and/or if any one of the measured changes of the actual value from each respective change measuring has not achieved the respective predefined change for the respective operation direction, generating the fault signal indicative of a fault of the component, unit or system. Thereby, further improved response time evaluation of the component, unit or system may be achieved. In fact, it has been further realized that response time of a component, unit or system may be important to evaluate in more than one operation direction. Purely by way of example, a moveable component, such as a valve or the like, may be moveable in two opposite operation directions. In order to provide a reliable response time evaluation thereof, it may be desirable to carry out response time measuring in both directions of the component.

Optionally, the component may be a moveable component, wherein the measuring of the response time and/or the measuring of the change of the actual value may be limited by measuring from a later time occurring after the time when the predefined minimum difference was exceeded, wherein a time period from the time when the difference was exceeded to the later time is indicative of an initial acceleration time period of the component. Thereby, the response time evaluation may be further improved in that the acceleration time period of the component can be disregarded. For example, by disregarding the acceleration time period, the change of the actual operation value over time may be linear, or at least partly linear, more accurately reflecting the actual capacity of the component, unit or system.

Optionally, the method may further comprise obtaining at least one environment parameter indicative of an ambient environment condition for the component, unit or system, such as temperature and available voltage level for the component, unit or system, wherein the at least one environment parameter has to fulfil a predetermined criterion in order to initiate the measuring of the response time and/or the measuring of the change of the actual value. Thereby the response time evaluation may be further improved. In fact, it has been further realized that also an ambient environment condition may negatively affect the response time evaluation. Therefore, by also considering at least one environment parameter for the response time evaluation, the response time evaluation may only be carried out when the predetermined criterion is fulfilled.

Optionally, the component may be a moveable component, wherein the at least one sensor is at least one sensor for measuring an actual position value of the moveable component.

Optionally, the system may be a system impacting air flow, wherein the at least one sensor is used to directly or indirectly determine the air flow in the system.

Optionally, the at least one sensor may be a sensor for measuring temperature, pressure, air flow, position, steps etc. Accordingly, operation values as mentioned herein may be values for temperature, pressure, air flow, position, steps etc.

Optionally, the measuring of the response time and/or the measuring of the change of the actual value may be repeatedly carried out, and the method may further comprise performing a statistical evaluation based on each measured response time and/or based on each respective measured change of the actual value to obtain a statistically obtained response time and/or change of the actual value, wherein the fault signal is generated if the statistically obtained response time is longer than the predefined response time and/or if the statistically obtained change has not achieved the predefined change. Accordingly, the fault signal may be generated first when the statistically obtained response time and/or statistically obtained change is obtained. The statistically obtained response time and/or change may for example be a mean value of the respective measured response times and/or changes. This approach is applicable to any one or all of the above mentioned operation areas and/or operation directions. Thereby a more reliable response time evaluation may be achieved.

Optionally, if a fault signal has been generated for at least one operation area and/or operation direction in which the response time measuring and/or the change measuring has been carried out, the method may further comprise performing at least one further response time and/or change measurement in the at least one operation area and/or operation direction for which the fault signal was generated, and generating a no-fault signal for the operation area and/or operation direction for which the fault signal was generated if the measured response time is equal to or shorter than the predefined response time and/or if the measured change of the actual value is equal to or exceeding the predefined change. Thereby, a more robust non-intrusive response-time method may be achieved. For example, it has been realized that a fault-signal may be generated due to a temporary fault which only may be present for a shorter time period. As such, by measuring again in the same operation area and/or in the same operation direction, it can be established whether the indicated fault was a real fault or only a temporary fault. Purely by way of example, ice on a movable rear-view mirror of a vehicle may result in a temporary fault-signal. By performing the response time measurement again after a certain time period, which may be predefined, it can be established if the fault signal was indicative of a real fault or if it was only a temporary fault due to the ice.

Still optionally, the aforementioned at least one further response time and/or change measurement for the at least one operation area and/or operation direction for which the fault signal was generated may be performed after the measuring of the response time and/or the measuring of the change of the actual value has been repeatedly carried out as mentioned in the above. Accordingly, purely by way of example, at least one further response time and/or change measurement may be performed for an operation area and/or operation direction which positively contributed to a generated fault signal. Thereby, a more robust and reliable method may be achieved, wherein the statistically obtained response time and/or change can be updated and re-evaluated by measuring again in the operation area(s) and/or operation direction(s) which positively contributed to the generated fault signal. The other operation area(s) and/or operation direction(s) which not contributed positively to the generated fault signal may accordingly not necessarily be evaluated again. However, purely by way of example, a new statistically obtained response time and/or change may be obtained by measuring again in the operation area(s) and/or operation direction(s) which positively contributed to the generated fault signal, and by also measuring in new operation areas and/or directions, replacing the other already evaluated operation areas and/or directions which not contributed positively to the generated fault signal. Thereby, an even further robust method may be achieved. For example, if measurement data is collected from four different operation areas and one of the measurements contributed positively to the generated fault signal, this operation area may be re-evaluated. Further, the other three already evaluated operation areas which not contributed positively to the generated fault signal may be replaced by measuring in three new operation areas, whereby the updated statistically obtained response time and/or change is based on the re-evaluated operation area and on the three new evaluated operation areas.

According to the second aspect of the invention, the object is achieved by a control unit for a vehicle for non-intrusive response time evaluation of a component, unit or system of the vehicle, the control unit being configured to perform the steps of the method according to any of the embodiments of the first aspect of the invention. Advantages of the second aspect of the invention are largely analogous to advantages of the first aspect of the invention. It shall also be understood that all embodiments of the first aspect of the invention are applicable to and combinable with all embodiments of the second aspect of the invention.

The control unit may be any kind of control unit of the vehicle, and it may also comprise more than one control unit, i.e. the control unit may be configured by two or more sub-control units, which may be provided close to each other or be separated from each other.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device. The control unit may comprise embedded hardware, sometimes with integrated software, where the hardware show close physical relationship. Examples of physical relationships are: shared casing and components mounted on one or several circuit boards.

According to the third aspect of the invention, the object is achieved by a vehicle comprising a component, unit or system and at least one sensor for measuring an actual operation value of the component, unit, or system, and further comprising the control unit according to any one of the embodiments of the second aspect of the invention. Advantages of the third aspect of the invention are largely analogous to advantages of the first aspect of the invention. It shall also be understood that all embodiments of the first and second aspects of the invention are applicable to and combinable with all embodiments of the third aspect of the invention, and vice versa.

Optionally, the component may be a moveable component, and wherein the at least one sensor is at least one sensor for measuring an actual position value of the moveable component.

Optionally, the moveable component may be any one of a valve, such as an EGR valve, a coolant valve and a crank case ventilation valve, any type of actuator, such as an actuator for an electric window, a valve actuator and an actuator for an electric trunk opening.

According to the fourth aspect of the invention, the object is achieved by a computer readable medium carrying a computer program comprising program code means for performing the steps of any of the embodiments of the first aspect of the invention, when said program product is run on the control unit according to the second aspect of the invention.

According to the fifth aspect of the invention, the object is achieved by a computer program comprising program code means for performing the steps of the method of any of the embodiments of the first aspect of the invention when said program is run on the control unit according to the second aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

It shall be understood that the figures are not necessarily drawn to scale.

DETAILED DESCRIPTION OF EXAMPLE EMBODIMENTS OF THE INVENTION

Figure 1:
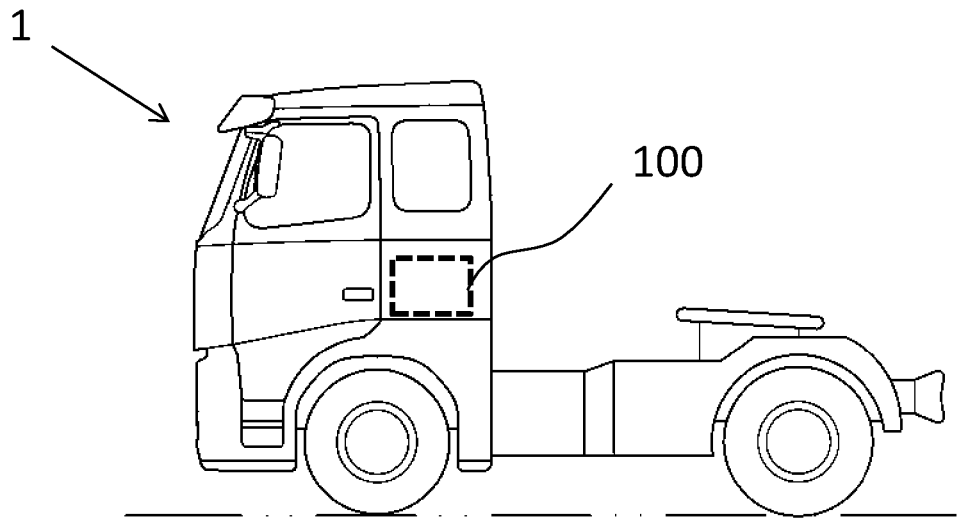
FIG. 1 is a side view of a vehicle according to an example embodiment of the present invention, FIGS. 2a and b are graphs showing a set operation value and an actual operation value of a component, unit or system over time according to example embodiments of the present invention.

FIG. 1 shows a side view of a vehicle in the form of a truck 1 according to an example embodiment of the third aspect of the present invention. The truck 1 comprises a control unit 100 according to the second aspect of the present invention. As mentioned in the above, it shall be understood that the present invention is not limited to only this type of vehicle, but may be used in any kind of vehicle as for example mentioned herein. The vehicle may for example comprise an internal combustion engine (ICE), such as a diesel powered engine connected to an exhaust aftertreatment system (EATS). The vehicle may also be a hybrid vehicle, comprising one or more electric motors for propulsion of the vehicle. The vehicle may also be a fully electric vehicle.

With respect to especially FIGS. 2 to 4, a method according to an example embodiment of the first aspect of the invention will be described. The method is a method for non-intrusive response time evaluation of a component 2 of a vehicle. The component 2 is here a valve, such as an EGR valve, but may also be any other kind of component. The component 2 is moveable between different positions. The different positions can be measured by a sensor 3, i.e. the sensor 3 can measure an actual operation value, that may be either absolute or relative, of the component 2, wherein the actual operation value is here a position value of the component 2. Purely by way of example, the sensor 3 may be an absolute position sensor or a relative position sensor.

The FIG. 2 graphs comprise two axes, where the y-axis represents position of the component 2 and the x-axis represents time. Accordingly, the operation value is here a position, even though it may be any other type of operation value as e.g. mentioned herein.

The method comprises:

S1: repeatedly obtaining information in the control unit 100 regarding a set operation value D and an actual operation value A of the component 2;

S2: repeatedly evaluating if a difference between the set operation value D and the actual operation value A is exceeding a predefined minimum difference Δminrange;

if the difference is exceeding the predefined minimum difference Δminrange,

S3: measuring a response time Δt from a time t0 when the predefined minimum difference Δminrange was exceeded until a time t0+Δt when a predefined change Δmeasrange of the actual value A is achieved (see FIG. 2a), wherein the measuring of the response time only remains active if the set operation value D is continuously greater than the actual value A at positive measurement or continuously smaller than the actual value A at negative measurement; and if the measured response time Δt is longer than a predefined response time, S4: generating a fault signal indicative of a fault of the component 2.

Figure 2A:
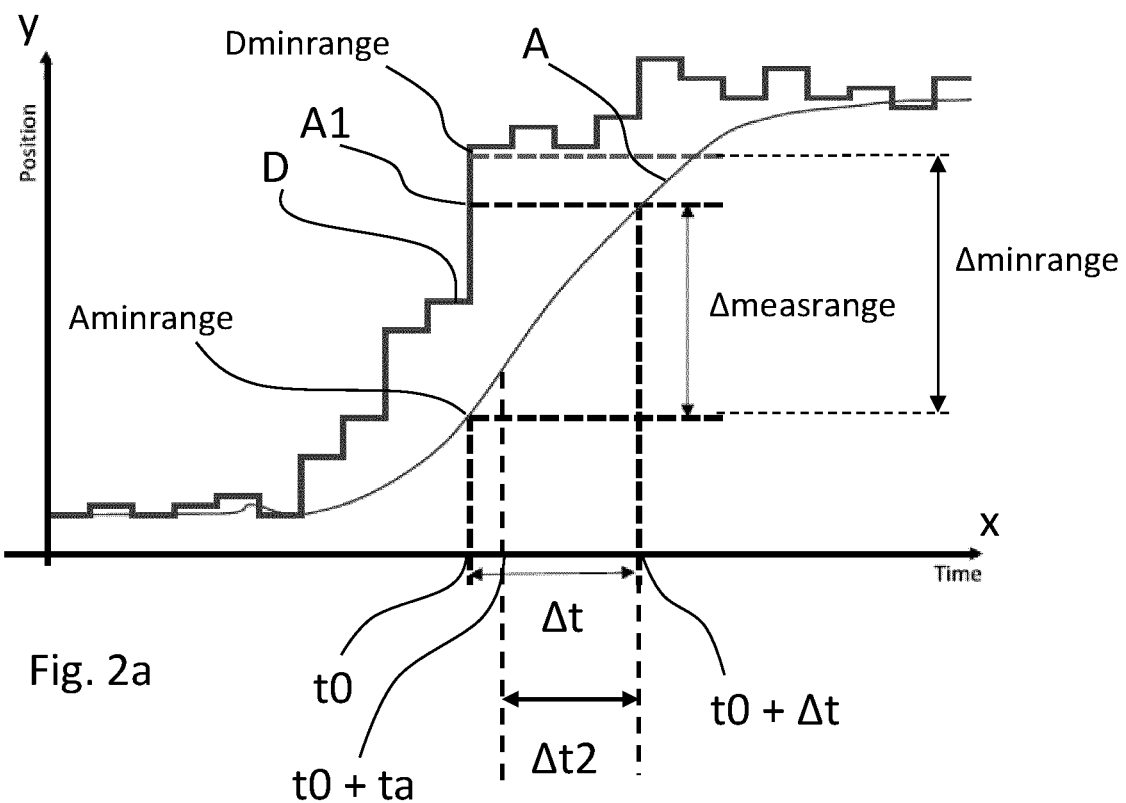
Figure 3:
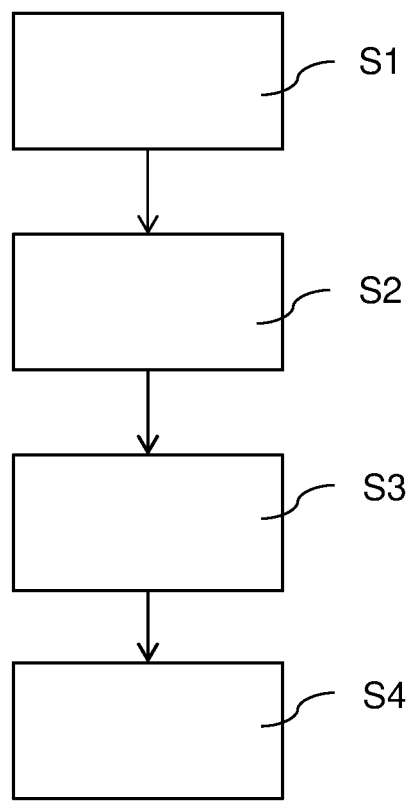
FIG. 3 is a flowchart of a method according to an embodiment of the present invention.

In the FIG. 2a embodiment, an end point range value Dminrange and an actual operation value Aminrange at the time t0 when the predefined minimum difference Δminrange was exceeded define end points for a range which corresponds to the predefined minimum difference Δminrange, wherein the predefined change Δmeasrange of the actual value A is smaller than the predefined minimum difference Δminrange. Accordingly, the predefined change Δmeasrange corresponds here to a smaller range which is defined by the actual operation value Aminrange at the time t0 when the predefined minimum difference Δminrange was exceeded and an actual value A1, which here is smaller than the end point range value Dminrange. This situation corresponds to positive measurement (shown in FIG. 2a) when the actual operation value A is increasing to reach the set operation value D. However, during negative measurement, i.e. a situation when the actual value A is decreasing to reach the set operation value D, an actual value reached when the predefined change is achieved would instead be a value which is larger than an end point range value and which defines one of the end points for a range which corresponds to the predefined minimum difference.

Alternatively or additionally of measuring response time as mentioned in the above, step S3 may comprise measuring a change of the actual value A during a predefined response time, and if the change of the actual value A has not achieved the predefined change Δmeasrange during the predefined response time, generating the fault signal indicative of a fault of the component, unit or system. A predefined response time as used herein may be regarded as predefined time or a predefined excepted time.

Figure 2B:
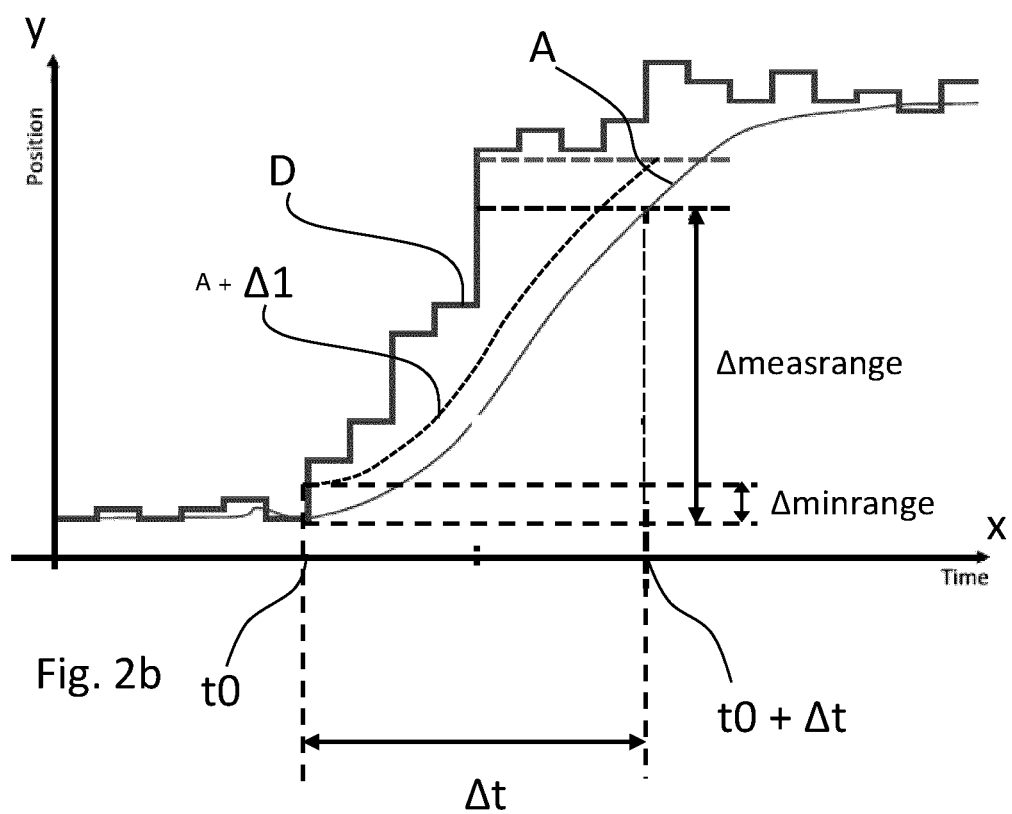

With respect to FIG. 2b, as an alternative or addition to the approach shown in FIG. 2a, the measuring of the response time and/or change may only remain active if the set operation value D is continuously above a value A+Δ1 defined by the actual value A together with a positive predefined threshold value+Δ1 at positive measurement. In a similar manner (not shown), the measuring of the response time and/or change may only remain active if the set operation value D is continuously below a value A−Δ1 defined by the actual value A together with a negative predefined threshold value −Δ1 at negative measurement.

However, in both embodiments as shown in FIGS. 2a and 2b, the set operation value D is continuously greater than the actual value A, i.e. at positive measurement, and therefore the measuring is remained active and not cancelled.

Moreover, with respect to FIG. 2a, the measuring of the response time and/or change may remain active if the set operation value D is continuously outside the end point range value Dminrange with respect to the actual operation value Aminrange at the time when the predefined minimum difference was exceeded. Consequently, the measuring of the response time is cancelled if the set operation value D moves to a position below the end point range value Dminrange at positive measurement. Accordingly, with respect to FIG. 2a, the response time measuring remains active as long as the set operation value D is above the end point range value Dminrange. This approach may also apply for negative measurement, wherein the measuring of the response time is cancelled if the set operation value D moves to a position above the end point range value.

In another embodiment of the present invention, the response time and/or change measurement may only remain active if the set operation value D is continuously outside of another end point range value (not shown) with respect to the actual operation value Aminrange at the time when the predefined minimum difference was exceeded. The other end point range value may for example be a value which is provided between the end point range value Dminrange and the actual value A1 as mentioned in the above. Still optionally, the predefined change Δmeasrange of the actual value A may accordingly also here be smaller than the predefined minimum difference Δminrange.

Moreover, if the difference is not exceeding the predefined minimum difference Δminrange, the method may further comprise waiting with measuring the response time Δt and/or change until the predefined minimum difference Δminrange is exceeded.

The method may comprise obtaining operation mode information indicative of different operation modes of the component 2, wherein the method further comprises that the measuring of the response time Δt and/or change is carried out if the difference is exceeding the predefined minimum difference Δminrange while also the operation mode information indicates that the component 2 is currently operating in a specific operation mode which is regarded as suitable for response time measurement. For example, the operation mode may correspond to a control strategy associated with normal operation of the component 2, such as a normal position change of the component 2 as shown in FIGS. 2a and b. The operation mode may also indicate a downgraded mode or a protection mode of the component 2, which may inhibit initiation of the response time measurement. A downgraded mode may be defined as a mode where the component, unit or system is operating slower than normal due to for example other faults present. A protection mode may be defined as a mode where the component, unit or system is operating in a non-normal mode in order to protect the component, unit or system, or any other relating member, from being damaged.

Figure 4:
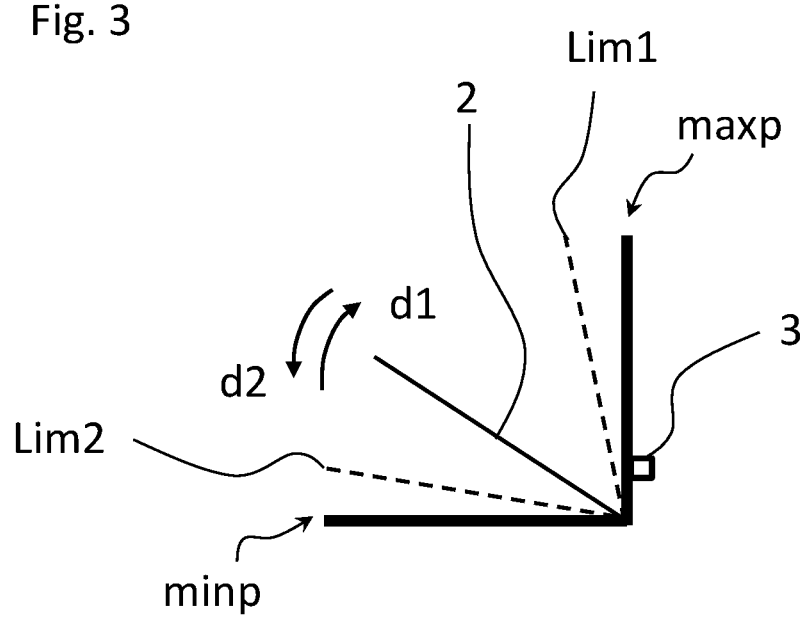
FIG. 4 is a schematic view of a component according to an example embodiment of the present invention.

FIG. 4 shows that the component 1 is operable within an operation range defined by a minimum operation value minp and a maximum operation value maxp, i.e. max and min position value, respectively. The method may accordingly further comprise that the measuring of the response time Δt and/or change is carried out if the difference is exceeding the predefined minimum difference Δminrange while also the actual operation value A is outside of a predefined limit value Lim1, Lim2 associated with any one of the minimum and maximum operation values minp, maxp. For example, the predefined limit value Lim1, Lim2 associated with any one of the minimum and maximum operation values minp, maxp may together define an area the component 2 shall be outside of, which area correspond to 0 to 20% of a maximum possible movement of the component 2. As such, the measuring of the response time Δt and/or change may be avoided when for example a control strategy is used which slows down the movement of the component 2 close to the minimum and maximum operation values minp, maxp.

The method may further comprise: if the measured response time Δt is equal to or shorter than the predefined response time and/or if the measured change of the actual value A is equal to or exceeding the predefined change Δmeasrange, generating a no-fault signal indicative of a no-fault of the component, unit or system.

The method may further comprise obtaining operation area information indicative of at least two different operation areas of the component 2, wherein a respective predefined minimum difference Δminrange, a respective predefined change Δmeasrange and/or a respective predefined response time is/are associated with each one of the at least two different operation areas. The response time and/or change measuring may be carried out in each one of the at least two different operation areas, and if any one of the measured response times from each respective response time measuring is longer than the respective predefined response time for the respective operation area and/or if any one of the measured changes of the actual value A from each respective change measuring has not achieved the respective predefined change for the respective operation area, generating the fault signal indicative of a fault of the component, unit or system. For example, the operation areas may be different ranges defined by actual position values of the component 2. Consequently, if no fault has been observed for the operation areas, a no-fault signal indicative of a no-fault of the component may be generated. The ranges may be smaller ranges, which may be suitable for measuring response at small position changes. The ranges may additionally or alternatively be larger ranges, which may be suitable for measuring response times at larger position changes. Thereby, the response time evaluation may be performed for different situations for the component 2, considered to be important for the performance of the component 2.

The method may further comprise obtaining operation direction information indicative of two different operation directions of the component 2, wherein a respective predefined minimum difference Δminrange, a respective predefined change Δmeasrange and/or a respective predefined response time is/are associated with each one of the two different operation directions. The response time and/or change measuring may be carried out in each one of the two different operation directions, and if any one of the measured response times from each respective response time measuring is longer than the respective predefined response time for the respective operation direction and/or if any one of the measured changes of the actual value A from each respective change measuring has not achieved the respective predefined change for the respective operation direction, generating the fault signal indicative of a fault of the component 2. Consequently, if no fault has been observed for the operation directions, a no-fault signal indicative of a no-fault of the component may be generated. With respect to FIG. 4, the operation directions may correspond to a first direction d1 when the component 2 is moving from the minimum operation value minp to the maximum operation value maxp, and to a second opposite direction d2 when the component 2 is moving from the maximum operation value maxp to the minimum operation value minp.

The measuring of the response time and/or change may be limited by measuring from a later time t0+ta occurring after the time t0 when the predefined minimum difference Δminrange was exceeded, wherein a time period from the time when the difference was exceeded to the later time is indicative of an initial acceleration time period of the component 2, which in this example is a moveable component. Thereby, with respect to FIG. 2a, the response time may correspond to the time period Δt2 instead of Δt. The actual capacity of the component 2 may be more correctly evaluated if disregarding the acceleration time period for the component 2.

The method may further comprise obtaining at least one environment parameter indicative of an ambient environment condition for the component 2, such as temperature and available voltage level for the component 2. Moreover, the at least one environment parameter may need to fulfil a predetermined criterion in order to initiate the measuring of the response time and/or change.

The measuring of the response time and/or change may be repeatedly carried out. More particularly, the method may further comprise performing a statistical evaluation based on each measured response time Δt and/or based on each respective measured change of the actual value A to obtain a statistically obtained response time and/or change of the actual value A, and wherein the fault signal is generated if the statistically obtained response time is longer than the predefined response time and/or if the statistically obtained change has not achieved the predefined change Δmeasrange.

Figure 5:
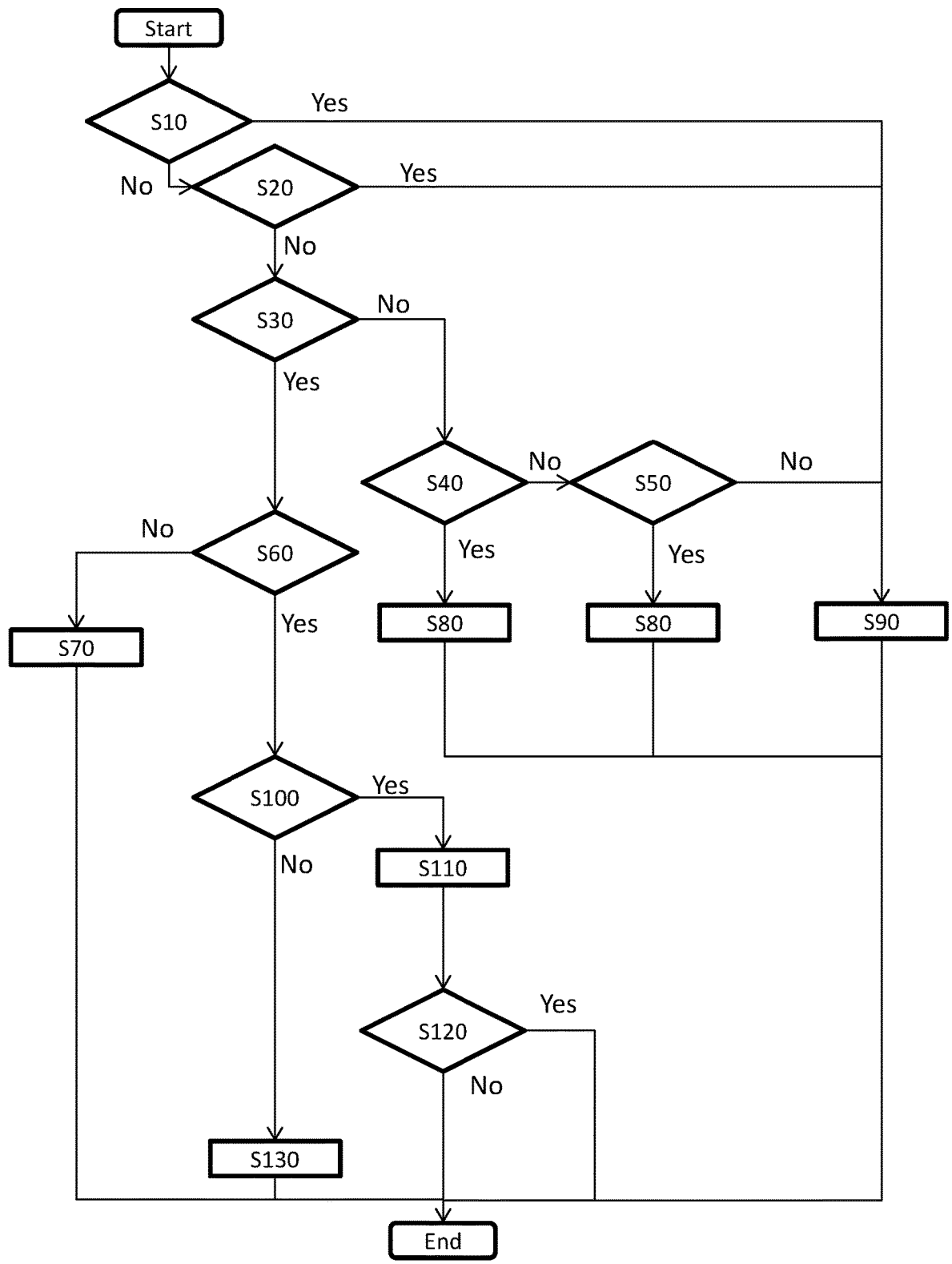
FIG. 5 is a flowchart of a method according to an example embodiment of the present invention.

FIG. 5 shows a flowchart of a method according to an example embodiment of the present invention. The box S10 represents a step of obtaining operation mode information as disclosed herein, where it is for example evaluated if the component, unit or system is currently operating in a downgraded mode or in a protection mode. If it is operating in e.g. a downgraded mode or protection mode, the method is continued to step S90 where the measurement is aborted. If it is not operating in a downgraded mode or protection mode, the method is continued to step S20.

Step S20 represents a step of obtaining at least one environment parameter indicative of an ambient environment condition for the component, unit or system, such as temperature and available voltage level for the component, unit or system, wherein the at least one environment parameter has to fulfil a predetermined criterion in order to initiate the measuring of the response time. If at least one environment parameter indicates that the component, unit or system's performance is negatively impacted by the ambient environment condition, the method is continued to step S90 where the measurement is aborted. On the other hand, if it is not impacted by an ambient environment condition, the method is continued to step S30. In addition to temperature and available voltage level, another non-limiting example of ambient environment conditions is pressure difference(s).

Step S30 relates to checking whether measurement is already ongoing or not. If not, the method is continued to step S40. If measurement is ongoing, the method is continued to step S60 instead.

Step S60 relates to checking whether the set operation value D is operating within certain limits as disclosed herein. For example, if the set operation value D is continuously outside the end point range value Dminrange, the measurement may be continued. Accordingly, if it is concluded that the measurement can be remained active, the method is continued to step S100. On the other hand, if it is concluded that the measurement should not be continued, the method is instead continued to step S70 where the measurement is aborted.

Step S100 relates to checking whether the predefined change Δmeasrange of the actual value A has been achieved or not and/or if the predefined response time has been achieved. If yes, the method is continued to step S110 where the measurement is completed. If not, the method is continued to step S130 where the measurement is continued.

Step 120 relates to checking whether the measured response time is longer than a predefined response time. If yes, the fault signal is generated, and if no a no-fault signal may be generated. Additionally or alternatively, step 120 may include measuring of a change as disclosed herein.

The steps S40 and S50 relate to positive and negative measurement, as disclosed herein. In step S40, relating to positive measurement, it is checked whether the set operation value D minus the actual operation value A is larger than the predefined minimum difference Δminrange. If yes, the method is continued to step S80 where the response time measurement and/or change measurement is started. If no, the method is continued to step S50, relating to negative measurement, where it is checked whether the actual operation value A minus the set operation value D is larger than the predefined minimum difference Δminrange. If yes, the method is continued to step S80 where the response time and/or change measurement is started. If no, the measurement is aborted or not started.

The present invention is applicable to all components, units and systems of vehicles where it may be relevant to e.g. detect a slow actuator response. However, the present invention may be more relevant for components, units and systems dealing with relatively fast responses. A non-exhaustive list of components, units and systems which may benefit of the present invention are EGR valve, coolant valve, crank case ventilation valve, electric window, electric trunk opening, electric rear mirror actuator, etc.

It is to be understood that the present invention is not limited to the embodiments described above and illustrated in the drawings; rather, the skilled person will recognize that many changes and modifications may be made within the scope of the appended claims.

The invention claimed is:

1. A method for non-intrusive response time evaluation of a component, unit or system of a vehicle comprising at least one control unit and at least one sensor for measuring an actual operation value of the component, unit, or system, the method comprising:
   repeatedly obtaining information in the control unit regarding a set operation value and an actual operation value of the component, unit, or system;
   repeatedly evaluating if a difference between the set operation value and the actual operation value is exceeding a predefined minimum difference;
   in response to determining that the difference is exceeding the predefined minimum difference, measuring a response time from a time when the predefined minimum difference was exceeded until a time when a predefined change of the actual value is achieved, wherein the measuring of the response time only remains active if the set operation value is continuously greater than the actual value at positive measurement or continuously smaller than the actual value at negative measurement; and
   in response to determining that the measured response time is longer than the predefined response time, generating a fault signal indicative of a fault of the component, unit or system.

2. The method according to claim 1, wherein the measuring of the response time only remains active if the set operation value is continuously outside of an end point range value with respect to an actual operation value at the time when the predefined minimum difference was exceeded, wherein the end point range value and the actual operation value at the time when the predefined minimum difference was exceeded define end points for a range which corresponds to the predefined minimum difference.

3. The method according to claim 1, wherein the predefined change of the actual value is smaller than the predefined minimum difference.

4. The method according to claim 1, wherein the measuring of the response time only remains active if the set operation value is continuously above a value defined by the actual value together with a positive predefined threshold value at positive measurement, and/or continuously below a value defined by the actual value together with a negative predefined threshold value at negative measurement.

5. The method according to claim 1, further comprising, if the difference is not exceeding the predefined minimum difference, waiting with measuring the response time until the predefined minimum difference is exceeded.

6. The method according to claim 1, further comprising obtaining operation mode information indicative of different operation modes of the component unit or system, wherein the method further comprises that the measuring of the response time is carried out if the difference is exceeding the predefined minimum difference while also the operation mode information indicates that the component, unit or system is currently operating in a specific operation mode which is regarded as suitable for response time measurement.

7. The method according to claim 1, wherein the component, unit or system is operable within an operation range defined by a minimum operation value and a maximum operation value, the method further comprising that the measuring of the response time is carried out if the difference is exceeding the predefined minimum difference while also the actual operation value is outside of a predefined limit value associated with any one of the minimum and maximum operation values.

8. The method according to claim 1, further comprising, if the measured response time is equal to or shorter than the predefined response time, generating a no-fault signal indicative of a no-fault of the component, unit or system.

9. The method according to claim 1, further comprising obtaining operation area information indicative of at least two different operation areas of the component, unit or system, wherein a respective predefined minimum difference, a respective predefined change and/or a respective predefined response time is/are associated with each one of the at least two different operation areas, wherein the response time measuring is carried out in each one of the at least two different operation areas, and if any one of the measured response times from each respective response time measuring is longer than the respective predefined response time for the respective operation area, generating the fault signal indicative of a fault of the component, unit or system.

10. The method according to claim 1, further comprising obtaining operation direction information indicative of two different operation directions of the component, unit or system, wherein a respective predefined minimum difference, a respective predefined change and/or a respective predefined response time is/are associated with each one of the two different operation directions, wherein the response time measuring and/or the change measuring is carried out in each one of the two different operation directions, and if any one of the measured response times from each respective response time measuring is longer than the respective predefined response time for the respective operation direction, generating the fault signal indicative of a fault of the component, unit or system.

11. The method according to claim 1, wherein the component is a moveable component and wherein the measuring of the response time is limited by measuring from a later time occurring after the time when the predefined minimum difference was exceeded, wherein a time period from the time when the difference was exceeded to the later time is indicative of an initial acceleration time period of the component, unit or system.

12. The method according to claim 1, further comprising obtaining at least one environment parameter indicative of an ambient environment condition for the component, unit or system, wherein the at least one environment parameter has to fulfil a predetermined criterion in order to initiate the measuring of the response time and/or the measuring of the change of the actual value.

13. The method according to claim 1, wherein the component is a moveable component, and wherein the at least one sensor is at least one sensor for measuring an actual position value of the moveable component.

14. The method according to claim 1, wherein the measuring of the response time and/or the measuring of the change of the actual value is repeatedly carried out, and wherein the method further comprises performing a statistical evaluation based on each measured response time to obtain a statistically obtained response time, and wherein the fault signal is generated if the statistically obtained response time is longer than the predefined response time.

15. The method according to claim 14, further comprising: if a fault signal has been generated for at least one operation area and/or operation direction in which the response time measuring has been carried out, the method further comprises:
performing at least one further response time in the at least one operation area and/or operation direction for which the fault signal was generated, and,
generating a no-fault signal for the operation area and/or operation direction for which the fault signal was generated if the measured response time is equal to or shorter than the predefined response time.

16. The method according to claim 15, wherein the at least one further response time for the at least one operation area and/or operation direction for which the fault signal was generated is performed after the measuring of the response time has been repeatedly carried out.

17. A control unit for a vehicle for non-intrusive response time evaluation of a component, unit or system of the vehicle, the control unit being configured to perform the steps of the method according to claim 1.

18. A vehicle comprising a component, unit or system and at least one sensor for measuring an actual operation value of the component, unit, or system, and further comprising the control unit according to claim 17.

19. The vehicle according to claim 18, wherein the component is a moveable component, and wherein the at least one sensor is at least one sensor for measuring an actual position value of the moveable component.

20. The vehicle according to claim 19, wherein the moveable component is a valve.

21. A method for non-intrusive response time evaluation of a component, unit or system of a vehicle comprising at least one control unit and at least one sensor for measuring an actual operation value of the component, unit, or system, the method comprising:

repeatedly obtaining information in the control unit regarding a set operation value and an actual operation value of the component, unit, or system;

repeatedly evaluating if a difference between the set operation value and the actual operation value is exceeding a predefined minimum difference;

in response to determining that the difference is exceeding the predefined minimum difference, measuring a change of the actual value during a predefined response time, wherein the measuring of the change only remains active if the set operation value is continuously greater than the actual value at positive measurement or continuously smaller than the actual value at negative measurement; and in response to determining that the change of the actual value has not achieved the predefined change during the predefined response time, generating a fault signal indicative of a fault of the component, unit or system.

\* \* \* \* \*